United States Patent Office 3,697,222
Patented Oct. 10, 1972

3,697,222
STERILIZATION WITH GLUTARALDEHYDE
Gonzalo Sierra, Mississauga, Ontario, Canada, assignor to Ontario Research Foundation, Toronto, Ontario, Canada
No Drawing. Filed Aug. 3, 1970, Ser. No. 60,623
Int. Cl. A61l 13/00
U.S. Cl. 21—54 A                 16 Claims

ABSTRACT OF THE DISCLOSURE

Sterilization is achieved by contacting a contaminated object with an aqueous acid glutaraldehyde solution at temperatures above about 45° C. The sterilizing action may be enhanced by ultrasonic energy. Sterilization also may be achieved using ultrasonic energy and aqueous alkaline glutaraldehyde solution.

This invention relates to sterilization, particularly to the sterilization of laboratory, surgical, dental and other equipment in the liquid phase.

The most common methods of sterilization involve either the use of steam under pressure or dry heat. However, these methods are cumbersome, tedious and time consuming, often damage the sterilized material and requires expensive equipment and skilled technicians.

Attempts have been made to develop substitutes for the above method. The power of a chemical sterilization agent is best measured by its ability to kill sporulating bacteria, while many of the disinfectants can kill vegetative bacteria, very few are capable of killing spores, such as those of Bacillus subtilis, Bacillus pumilus, Clostridium sporogenes and Clostridium tetani.

Recently there has been marketed an aqueous solution of glutaraldehyde buffered to an alkaline pH; generally around 7.5 to 8.0, which solution is effective in killing such spores at temperatures of around 20 to 25° C. This treatment is very time-consuming and involves generally from 3 to 10 hours to achieve complete deactivation. U.S. Pat. 3,016,328 issued Jan. 9, 1962 to Rollin E. Pepper et al. and assigned to Ethicon, Inc., describes such material. It is stated in that patent that acid aqueous solutions of glutaraldehyde are not effective in killing or deactivating sporulating bacteria.

The use of alkaline solutions of glutaraldehyde as sterilizing agents suffers from a number of defects. Firstly, aqueous solutions of glutaraldehyde are inherently acidic and to achieve the required alkaline solution, it is necessary to carefully buffer the acidic aqueous solution. Generally, this has been achieved by utilizing sodium bicarbonate or other mild base.

Secondly, while acid aqueous solutions of glutaraldehyde are stable and have long shelf-life, alkaline solutions by contrast tend to lose their sporicidal activity upon storage. This latter defect has led to the marketing of the product in the form of an aqueous acid solution of glutaraldehyde together with a separate container of solid buffer, the buffer is added to the acid solution just prior to use to render the solution alkaline.

This clearly gives rise to problems. Thus, the container of buffer may become detached from the container of aqueous glutaraldehyde. Alternatively, the addition of buffer may be omitted. In either case this leads to the use of a solution known to be ineffective at 20° to 25° C.

It has been found in accordance with one aspect of the present invention that aqueous acid solutions of glutaraldehyde may be used as effective sterilizing agents in killing or destroying sporulating bacteria, such as Bacillus subtilis at temperatures above about 45° C. Thus, it is possible to market an aqueous acid solution, which has a long shelf life, and avoid the problems associated with the separate provision of buffers, which must be mixed in with the acid solution.

Preferably the temperature of sterilization is about 65° to 70° C., since at these temperatures sporulating bacteria are rapidly deactivated. Deactivation with acid solutions at those temperatures is much more rapid than alkaline solutions at 25° C.

The concentration of the aqueous glutaraldehyde solution may vary over a wide range, but generally solutions of concentrations up to about 7.5% may be effectively utilized. Preferably, the concentrations vary between about 1 and 2%.

As indicated above, in this aspect of the present invention, the aqueous glutaraldehyde solution is acid. The pH may be varied in the acid region by suitable buffering. Generally, the pH varies between about 2 and 5. It is preferred to utilize an aqueous glutaraldehyde solution in the absence of any buffers and hence at the natural acid pH of the particular solution.

In certain instances, the solution may have a corrosive effect, depending on the acidity employed or the nature of the object to be sterilized. It is possible to incorporate anticorrosion agents in the solution to counteract this effect.

Ultrasonic energy has been proposed for rendering the human arm and hand surgically clean in a device using bactericides, as may be seen in U.S. Pat. 3,481,687 issued Dec. 2, 1969 to Sherman S. Fishman.

In said patent, however, no specific mention is made regarding the destruction of spores or synergistic effects between certain chemicals and ultrasonics. No value of acoustic energy density is given in the patent and it is said that a device is to be used to achieve cavitation which does not produce harmful biological side effects and pain. This means automatically that no resistant spore can be destroyed since the density of acoustic energy for effective spores destruction has to be far above the one corresponding to pain threshold.

In another report (E. O., Shaner, Augmentation of Bactericidal Action of Germicides With Ultrasound, Jour. Acou. Soc. Am., 36:2238, 1964) it has been shown that sonification of germicidal solutions increases the bactericidal efficiency. Vegetative organisms were also said to be quickly destroyed but spores were not.

In other reports (A Study of the Effectiveness of the Steri-Sonic 400, Micro-biocidal Agent on Pathogenic Organisms, Parkin Biochem. Corp., Highwood, Calif.) which deal with the destruction of pathogens at high temperatures (95° C.) through a combination of ultrasonic energy at 400 kHz. and a wetting agent (Tween 40) no positive results were claimed with thermoresistant spores.

In accordance with a second aspect of the present invention, the sterilizing action of an acid aqueous solution of glutaraldehyde is enhanced by the use of ultrasonic sound energy.

It has been found that where such ultrasonic sound energy is employed in addition to the acid glutaraldehyde, then the acid glutaraldehyde solution may be utilized at lower temperatures, generally down to about 15° C. Sterilizing action may be obtained at approximately room temperature (i.e. about 25° C.). It is preferred, however, to use an elevated temperature, particularly 55° to 65° C.

The frequency of the ultrasonic sound may be any convenient value, generally up to about 300 kHz. Sound in the sonic frequency range also may be employed satisfactorily. The frequency of the sound energy employable in this second aspect of the invention varies between about 8 and 300 kHz., preferably about 15 to 45 kHz. and particularly around 20 kHz.

The energy density of application of the sonic energy to aqueous glutaraldehyde solution may vary over a wide range, typically from about 10 watts per litre to about 5 watts per cubic centimetre.

The sonic energy also may be employed in conjunction with the aforementioned aqueous alkaline glutaraldehyde solutions. Such alkaline solutions may be utilized over a range of temperature and such solutions may effectively be used at about 25° C. It is preferred to use an elevated temperature of about 55° to 65° C. to enhance the speed of the sporicidal activity of the solution. At these temperatures, the sound energy enhances the sterilizing ability of the glutaraldehyde solution.

The combination of sonic energy with a glutaraldehyde solution leads to the provision of readily operable sterilizing equipment for use in sterilizing surgical and dental instruments.

The invention is illustrated by the following examples:

EXAMPLE I

A number of acid aqueous glutaraldehyde solutions of about 1% concentration were prepared having pHs 2.6, 3.7 and 4.7. The effectiveness of these solutions was tested on spores of *Bacillus subtilis* at 70° C. It was found that the spores were completely inactivated in 5 minutes.

EXAMPLE II

The effectiveness of an acid aqueous glutaraldehyde solution of about 1% concentration and pH 3.3 was tested on *Bacillus subtilis* at various temperatures, namely 45° C., 55° C. and 65° C. Significant deactivation of the spores occurred at each temperature and complete deactivation was achieved in 10 minutes at 65° C.

By way of contrast, a 2% glutaraldehyde aqueous solution at pH of about 8.0 at 25° C. took approximately 3 hours to deactivate the spores.

EXAMPLE III

An aqueous alkaline glutaraldehyde solution at about 1% concentration having a pH of 8.0 was tested for effectiveness as a sterilizing agent in the presence of ultrasonic energy of about 20 kHz. frequency and at an energy density level higher than 10 watts/litre. The tests were carried out on *Bacillus subtilis* spores one at a temperature of about 25° C. and another at a temperature of about 55° C. It was found that at the temperature of 25° C. while some inactivation of the spores at 25° C. was achieved in about 30 minutes, complete inactivation of the spores at 55° C. was achieved in about 5 minutes.

EXAMPLE IV

An aqueous acid glutaraldehyde solution at about 1% concentration having a pH of 2.2 was tested for sterilizing activity on *Bacillus subtilis* spores in the presence of ultrasonic energy of about 20 kHz. frequency and at an energy density level higher than 10 watts/litre at 60° C. Complete deactivation of the spores occurred in about 5 minutes. This result is in contrast to that in Example II where a similar acid solution was tested in the absence of ultrasonic energy, and it was found that a 10 minutes treatment at 65° C. was necessary for deactivation of the spores. This shows the enhanced effect due to synergism between the ultrasonic energy and the chemical.

EXAMPLE V

The aqueous glutaraldehyde solution used in Example III was tested at 25° C. in the presence of ultrasonic sound of a frequency of about 250 kHz. at an energy density level higher than 10 watts/litre. Complete deactivation of the *Bacillus subtilis* spores was achieved in about 30 minutes.

Modifications are possible within the scope of the invention.

What I claim is:

1. A method of sterilizing a contaminated object which comprises contacting said object with an aqueous solution of glutaraldehyde having an acid pH at a temperature above about 45° C., whereby destruction of spores, if present, is effected.

2. The method of claim 1, wherein said aqueous solution has a pH of about 2 to about 5.

3. The method of claim 1 wherein the temperature is about 65° to 70° C.

4. The method of claim 1 wherein said aqueous solution has a concentration of about 1 to 2%.

5. The method of claim 1 wherein said aqueous solution has a pH of about 2 to about 5 and a concentration of about 1 to 2% and said temperature is about 65° to 70° C.

6. A method of sterilizing a contaminated object which comprises contacting said object with an aqueous solution of glutaraldehyde substantially at atmospheric pressure and at a temperature below the boiling point of said aqueous solution while simultaneously subjecting said solution to sound energy having a frequency of about 8 kHz. to about 300 kHz. at a power of about 10 watts/litre to about 5 watts/cubic centimetre, whereby destruction of spores, if present, is effected.

7. The method of claim 6 wherein said sound energy has a frequency of about 15 to 45 kHz.

8. The method of claim 6 wherein said sound energy has a frequency of about 20 kHz.

9. The method of claim 6 wherein said aqueous solution has a pH of about 7.5 to 9.

10. The method of claim 6 wherein said contact takes place at a temperature in excess of about 15° C.

11. The method of claim 6 wherein said aqueous solution has a pH of about 2 to 5 and a concentration of about 1 to 2%, said sound energy has a frequency of about 20 kHz., and said contact takes place at a temperature of about 55° to 65° C.

12. The method of claim 6 wherein said aqueous solution has a pH of about 7.5 to 9 and a concentration of about 1 to 2%, said sound energy has a frequency of about 20 kHz., and said contact takes place at a temperature of about 55° to 65° C.

13. The method of claim 6 wherein said aqueous solution has a pH of about 7.5 to 9 and a concentration of about 1 to 2%, said sound energy has a frequency of about 250 kHz. and said contact takes place at a temperature of about 25° C.

14. A method of sterilizing a contaminated object which comprises contacting said object with an aqueous solution of glutaraldehyde having a pH of about 2 to 5 while simultaneously subjecting said solution to sound energy having a frequency of about 8 kHz. to about 300 kHz. at a power of about 10 watts/litre to about 5 watts/ cubic centimetre, whereby destruction of spores, if present, is effected.

15. A method of sterilizing a contaminated object which comprises contacting said object with an aqueous solution of glutaraldehyde at a temperature of about 25° C. while simultaneously subjecting said solution to sound energy having a frequency of about 8 kHz. to about 300 kHz. at a power of about 10 watts/litre to about 5 watts/cubic centimetre whereby destruction of spores, if present, is effected.

16. A method of sterilizing a contaminated object which comprises contacting said object with an aqueous solution of glutaraldehyde at a temperature of about 55° to 65° C. while simultaneously subjecting said solution to sound energy having a frequency of about 8 kHz. to about 300 kHz. at a power of about 10 watts/litre to about 5 watts/cubic centimetre, whereby destruction of spores, if present, is effected.

References Cited

UNITED STATES PATENTS

| | | | |
|---|---|---|---|
| 3,282,775 | 11/1966 | Stonehill | 424—333 X |
| 3,016,328 | 1/1962 | Pepper | 424—127 |
| 2,801,216 | 7/1957 | Yoder | 424—333 X |
| 2,717,874 | 9/1955 | Verain | 21—102 R |
| 3,481,687 | 12/1969 | Fishman | 21—54 R |

FOREIGN PATENTS

| | | | |
|---|---|---|---|
| 947,700 | 1/1964 | Great Britain | 21—58 |
| 947,699 | 1/1964 | Great Britain. | |

OTHER REFERENCES

C. F. Reddish, "Antiseptics, Disinfectants, and Sterilization," 2nd Ed. (1957), pp. 381, 438, 832.

MORRIS O. WOLK, Primary Examiner

D. G. MILLMAN, Assistant Examiner

U.S. Cl. X.R.

21—58; 424—333